July 5, 1932.  F. W. CURTIS  1,865,617
METAL CUTTING TOOL
Filed May 21, 1931   2 Sheets-Sheet 1

INVENTOR
Frank W Curtis
BY
Fred G Parsons
ATTORNEY

July 5, 1932.  F. W. CURTIS  1,865,617
METAL CUTTING TOOL
Filed May 21, 1931   2 Sheets-Sheet 2

INVENTOR
Frank W Curtis
BY
Fred G Parsons
ATTORNEY

Patented July 5, 1932

1,865,617

UNITED STATES PATENT OFFICE

FRANK W. CURTIS, OF WAUWATOSA, WISCONSIN, ASSIGNOR TO KEARNEY & TRECKER CORPORATION, OF WEST ALLIS, WISCONSIN

METAL CUTTING TOOL

Application filed May 21, 1931. Serial No. 538,937.

This invention relates to cutting tools and more particularly to a face milling cutter.

It is a purpose of the invention to provide an improved cutting tool of the type in which the cutting portions are of different material than the body.

A further purpose is to provide an improved form of face mill having a cutter body providing an improved support for the cutting portions while permitting ample room or clearance for the chips removed from the work.

Further purposes relate to an improved form of face mill having removable blades in which the cutting portion is formed separately from the shank portion and particularly relate to an improved mechanical structure adapted for rigidly joining a relatively small cutting tip with a shank to form a unitary blade.

Other purposes are generally to simplify and improve the construction and operation of cutting tools, particularly of milling cutters, and still other purposes will be apparent from the specification and claims.

The cutter herein illustrated is an improved form of a similar cutter forming the subject matter of the application of Edward J. Kearney et al., Serial 280,222, filed may 24, 1928.

Figure 1:
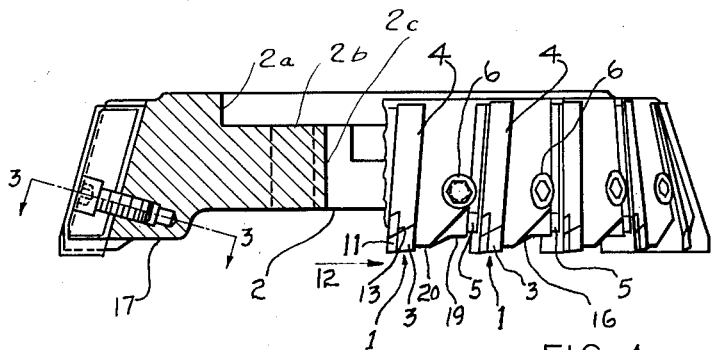
Fig. 1 is partly in section and shows the cutter as viewed from the periphery thereof, the section being taken along line 1—1 of Fig. 2.

The cutter shown is of the so-called face milling type providing a plurality of cutting elements or portions 1—1, etc., spaced around the periphery of an annular cutter body 2, the cutting elements 1 being formed for work material removal when the cutter body is rotated on its axis and advanced relative to the work in a direction at right angles to its axis. The body 2 is intended to be rotated coaxially with the tool spindle not shown, of a milling machine, a recess 2a being provided to center the body on the end of the spindle and holes 2b being provided to receive bolts, not shown, or other means for fixing the cutter and spindle together. The cutter may instead be supported and driven from a tool arbor fitted in a bore 2c in the usual manner.

Such cutters are sometimes formed of solid metal, but in this instance the cutting portions 1 are rigidly bonded with shanks 3—3, etc., to form removable blades either by brazing, welding, or other suitable means, and the blades are removably and adjustably carried in slots 4—4, etc., in the cutter body. For adjustably retaining the blades in the slots there is provided a construction forming the subject matter of the patent application previously referred to and which will, therefore, here be only briefly described.

Figure 3:
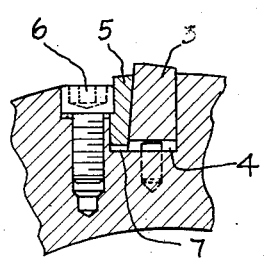
Fig. 3 is a partial section along line 3—3 of Fig. 1.
Figure 8:
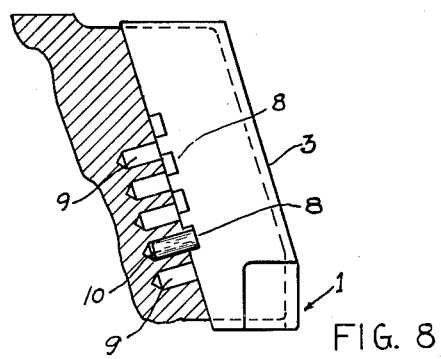
Fig. 8 is a partial section of the cutter body showing a blade in place.

The slots 4 are sufficiently wide to accommodate the shanks 3 and wedges 5, the wedges being retained and forced downwardly by screws 6. The adjacent faces of the shanks 3 and wedges 5 are angularly disposed, as particularly shown in Fig. 3, and downward pressure on the wedges, brought about by the screw 6, forces the blade not only to the right in Fig. 3, but also downwardly against the bottom of the blade slot, there being clearance provided at 7 underneath the wedge. To prevent a shifting of the blade axially of the cutter body whereby to rigidly retain it against pressure set up in the cutting, there is provided a series of configurations 8, see Fig. 8, in the shanks 3 and a series of configurations 9 in the bottom of the slots of the cutter body, there being key elements 10 which may be cooperative between various of the configurations 8 and 9 to provide an abutment preventing movement of the blade in a direction in which cutting forces would tend to move the blade along the cutter axis. Upon removal of the screws 6 the wedges 5 may be removed whereby to remove the blade for various purposes and when the blade is replaced, it may be set forward to compensate for wear or material removed in grinding by utilizing different of the configurations 8 and 9.

The cutting portions 1 are of a different material than the shanks 3, being in the form of a relatively small tip or blade portion 11. These tips are fitted closely into a recess or form in the shank 3, preferably having a general form similar to that shown in Figs. 4, 5, 6, and 7.

Figure 4:
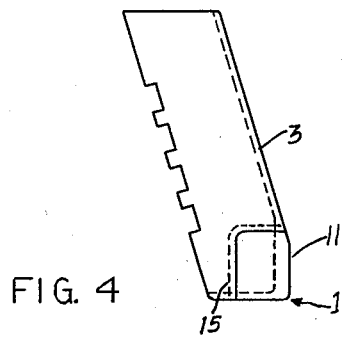
Figs. 4 and 5 show different views of one of the removable cutting tools or blades.
Figure 5:
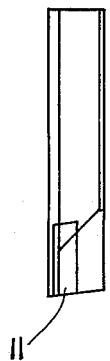
Figure 6:
Fig. 6 shows a cutting tip, also shown in Fig. 4, but here shown removed from the shank with which it is associated.
Figure 7:
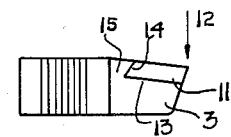
Fig. 7 shows an end view of the blade shown in Figs. 4 and 5.
Figure 9:
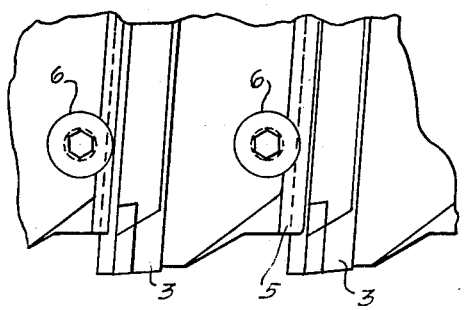
Fig. 9 is a partial development of a portion of the cutter body showing two of the blades in place.

This form is such that the tip 11 has a considerable area directly opposing the cutting strains which normally are in the general direction shown by the arrow 12, Figs. 1 and 7, and of a form such that the shanks 3 provide a rigid support and backing for the tips 11. In this instance the tips are relatively thin in a direction transverse to the cutting forces and provided with a substantially flat seat 13, Figs. 1 and 7, directly opposing the cutting force. The tips are welded, brazed, or similarly bonded with the shanks 3 throughout the adjacent complementary surfaces, but, in addition, and in order, so far as may be possible, to firmly anchor the tips against twisting or tipping strains, there is provided an interlock dovetail portion 14 on the tip closely fitting a complementary form in the blade 3 as at 15, Fig. 7. As shown in Figs. 4 and 6, such interlocking form is carried throughout the edges of the tip and shank and wherever it may be possible for such construction to assist in anchoring the tip with the shank. In addition to the anchoring or interlocking action of the construction just described, it serves another purpose in that the area which may be bonded is materially increased and at points particularly effective in resisting strains set up in the cutting which might otherwise tear the tip from the shank.

Figure 2:
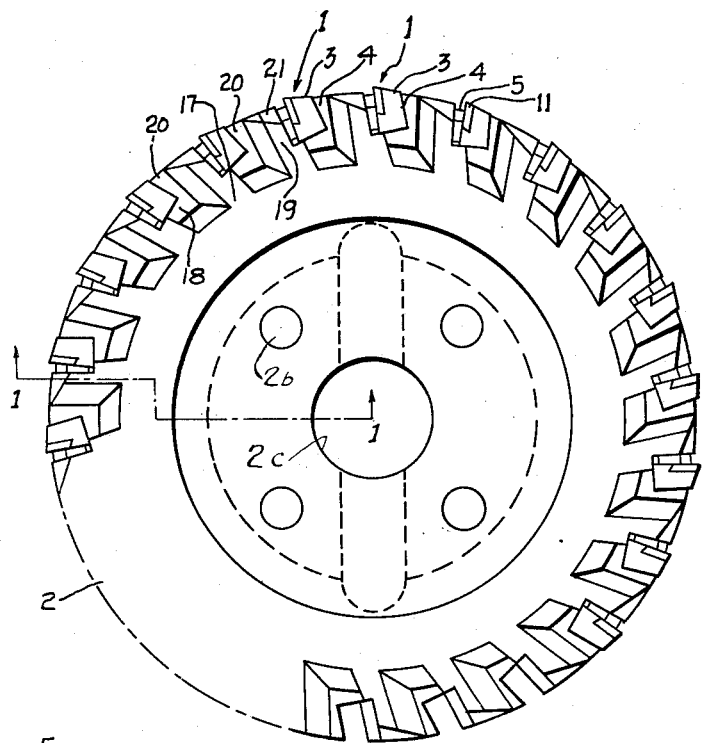
Fig. 2 shows the cutter as viewed from the face. It will be understood that Fig. 2 does not show all of the blades or slots provided in the complete cutter.

The cutter body is formed to provide chip clearance while permitting of a minimum unsupported overhang of the cutting portion of the blades. Referring to Fig. 1, it will be noted that the blades are adjusted for the cutting surfaces 1 to project very slightly from the supporting portions 16 of the cutter body. Such slight projection as is there shown would not normally provide sufficient chip clearance and chip portions would tend to wedge against the cutter body and scratch the work or greatly increase the power required for cutting, or be otherwise objectionable. The cutter body, therefore, is cut away as follows: An annular portion is removed, as above illustrated at 17, Figs. 1 and 2, of an outer diameter such that a substantial portion of metal still remains supporting the blades in the direction toward the cutter axis, as at 18, Fig. 2. Body material is further removed as at 19, Figs. 1 and 2, the metal being removed in a manner such that portions of the body are left as at 20, Figs. 1 and 2, to directly support the blades against cut pressures yet providing a considerable chip clearance where the portions 19 have been removed. A still further removal of body material may be made as at 21, Fig. 2.

The effect of the removal of body material as described is to provide body portions which may be described as projecting from the main body portion to rigidly support each of the cutting blades to a point only barely clearing the work surface which would be generated by the cutting action of the blades, yet providing for a liberal chip space at points best adapted to receive the chips as they are removed during the cutting.

It may be stated that the form of cutter herein illustrated and described, or suitable modifications thereof, is more particularly adapted for such tool materials as are inherently brittle and incapable of standing even slight distortion or bending. Such tool materials have been developed capable of a great increase in productive capacity, but the use thereof has heretofore been limited by reason of previous cutter designs which were not suited for such materials.

Having now fully revealed the invention, what is claimed is:

1. In a rotatable face milling cutter, the combination of an annular cutter body providing a plurality of peripherally open slots extended axially, blades removably fitted in said slots and adapted for work material removal to produce a plane surface when said cutter is rotated and advanced in a direction at right angles to said axis of rotation, and clamp devices restraining said blades against movement relative to said body, some of said blades comprising a supporting portion and a cutting portion separately formed and fitted with said supporting portion along a plurality of contact surfaces permanently bonded together, said contact surfaces being of a form providing a mechanical interlock for restraining said portions against separation when acted upon by the forces set up during work material removal and irrespective of said bonding, and of a form adapted to increase the surface area available for bonding, said body having portions cut away for the remaining portions to project axially whereby to provide for said blades a projecting body portion adapted for blade support in one direction along a line substantially tangent to the periphery of said annulus while providing for said blades a chip clearance space in the opposite direction and said blades being fixed in said body to project axially beyond said projecting body portions only a fractional part of the dimension of said blades in the direction of the extension of said line.

2. In a face milling cutter, the combination of an annular body portion constructed for the one end face thereof to be fixed adjacent a tool spindle for rotation therewith, said body providing peripheral slots extended substantially parallel with the axis of said rotation, blades removably fixed in said slots and formed for work material removal to produce a plane surface when said cutter is rotated and advanced in a direction at right angles to said axis of rotation, said blades each including a cutting portion projecting from said body at the other end face thereof and a supporting portion separately formed and permanently bonded with said cutting portion, said blades each providing a front face in the intended cutting direction, a rear face in the opposite direction and a bottom face in the direction of the axis of said body portion and each being positioned in said slots for said projecting cutting portion to extend outside said body a distance substantially less than the distance between said front and rear faces, said body being configurated to support said blades on said rear and bottom faces thereof and to provide a recess adjacent said front faces, forming for each of said blades sufficient space for chips when the blade is projected from said body only sufficient for clearance between said body and the work being cut and clamp means for retaining said blades and comprising devices restricted within a cylinder coaxial with said axis of rotation and having a diameter substantially equal to the diameter of said body portion.

3. In a face milling cutter, the combination of an annular body portion constructed for the one end face thereof to be fixed adjacent a tool spindle for rotation therewith, said body providing peripheral slots extended substantially parallel with the axis of said rotation, blades removably fixed in said slots and formed for work material removal to produce a plane surface when said cutter is rotated and advanced in a direction at right angles to said axis of rotation, said blades each including a cutting portion projecting from said body at the other end face thereof and a supporting portion separately formed and permanently bonded with said cutting portion, said blades each providing a front face in the intended cutting direction and in part formed of said cutting portion, and a rear face in the opposite direction, said blades being positioned in said slots for said body to provide cutting support against said rear faces to a point where the extension of said projecting portions outside such support is a small fractional part of the thickness of said blades between said front and rear faces thereof, said body providing recessed portions at said other end face thereof and adjacent said front faces providing sufficient space for chips, when said blades are projected from said body only sufficiently to provide cutting clearance.

4. In a face milling cutter, the combination of an annular body portion constructed for the one end face thereof to be fixed adjacent a tool spindle for rotation therewith, said body providing peripheral slots extended substantially parallel with the axis of said rotation, blades removably fixed in said slots and formed for work material removal to produce a plane surface when said cutter is rotated and advanced in a direction at right angles to said axis of rotation, said blades each including a cutting portion projecting from said body at the other end face thereof and a supporting portion separately formed and permanently bonded with said cutting portion, said blades each providing a front face in the intended cutting direction, a rear face in the opposite direction, and a bottom face in the direction of the axis of said body said blades being positioned in said slots for said projecting cutting portions to extend from said body a distance equal to less than half the thickness of said blades between said front and rear faces and said body being configurated to provide chip space adjacent said front faces sufficient for said position of said blades.

5. In a rotatable face milling cutter, the combination of an annular body portion, the axis of the annulus thereof coinciding with the axis of said rotation, said body portion providing peripheral slots extending substantially parallel with said axis of rotation, blades in said slots and formed for work material removal to produce a plane surface when said cutter is rotated and advanced in a direction at right angles to said axis of rotation, said blades each including a cutting portion projecting from said body portion at one or the other end face thereof and a supporting portion separately formed and permanently bonded with said cutting portion, said blades each providing a front face in the intended cutting direction, a rear face in the opposite direction, said cutting portions forming a relatively small part of said front faces and being relatively thin in the direction of said rear faces, said supporting portions being extended substantially to the end of said projecting cutting portion, said blades being positioned in said slots for said projecting cutting portion to extend outside said body a distance equal to a fractional part of the thickness of said blades between said front and rear faces only sufficient for the cutter body to properly clear the work, said body being recessed to provide a substantial chip space adjacent said front faces when said blades are projected from said body as described, and clamp means adapted to fix the relative position of said blades and body in the projecting position last mentioned and releasable to permit adjustment of said blades.

In witness whereof I have hereto affixed my signature.

FRANK W. CURTIS.